United States Patent
Anazawa et al.

(10) Patent No.: US 7,244,373 B1
(45) Date of Patent: Jul. 17, 2007

(54) COMPOSITE AND METHOD OF MANUFACTURING THE SAME

(75) Inventors: Kazunori Anazawa, Nakai-machi (JP);
Chikara Manabe, Nakai-machi (JP);
Masaki Hirakata, Nakai-machi (JP);
Kentaro Kishi, Nakai-machi (JP);
Taishi Shigematsu, Nakai-machi (JP);
Miho Watanabe, Nakai-machi (JP);
Hiroyuki Watanabe, Nakai-machi (JP);
Takashi Isozaki, Nakai-machi (JP);
Shigeki Ooma, Nakai-machi (JP);
Shinsuke Okada, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 408 days.

(21) Appl. No.: 10/770,575

(22) Filed: Feb. 4, 2004

(30) Foreign Application Priority Data

Sep. 25, 2003 (JP) ............................. 2003-333777

(51) Int. Cl.
*H01B 1/04* (2006.01)
*H01B 1/00* (2006.01)

(52) U.S. Cl. .................. 252/500; 252/504; 252/502; 977/745; 977/748

(58) Field of Classification Search ................ 252/502; 427/101; 338/22 R; 977/734, 742
See application file for complete search history.

(56) References Cited

U.S. PATENT DOCUMENTS 6,203,814 B1 * 3/2001 Fisher et al. ................ 424/443
2003/0086858 A1 * 5/2003 Niu et al. ................. 423/447.1
2004/0028901 A1 * 2/2004 Rumpf et al. ............... 428/375
2004/0222080 A1 * 11/2004 Tour et al. .............. 204/157.15
2004/0247808 A1 * 12/2004 Cooper et al. .............. 428/36.1
2005/0067607 A1 * 3/2005 Zhan et al. ................. 252/502
2006/0115640 A1 * 6/2006 Yodh et al. ................. 428/221

FOREIGN PATENT DOCUMENTS

JP     A 2001-288626     10/2001
JP     A 2002-234000     8/2002

OTHER PUBLICATIONS

A. Peigney et al., "Carbon nanotubes in novel ceramic matrix nanocomposites," Ceramics International, 26, pp. 677-683 (2000).*
Lyubchenko et al., "Atomic force microscopy of DNA and bacteriophage in air, water and propanol: the role of adhesion forces," Nucleic Acids Research, vol. 21, No. 5, pp. 1117-1123, 1993.

* cited by examiner

*Primary Examiner*—Mark Kopec
*Assistant Examiner*—Jaison Thomas
(74) *Attorney, Agent, or Firm*—Oliff & Berridge, PLC (57) ABSTRACT

To provide a composite excellent in mechanical strength or in electric conductivity and obtained by combining a carbon nanotube structure and ceramics, and a method of manufacturing the same. The composite is composed of the carbon nanotube structure and the ceramics, and, in the carbon nanotube carbon nanotube structure, functional groups bonded to multiple carbon nanotubes are chemically bonded to mutually cross-link to construct a network structure.

36 Claims, 5 Drawing Sheets

REACTION SCHEME FOR POLYMERIZATION OF CARBON NANOTUBE CARBOXYLIC ACID METHYL ESTER AND GLYCERIN BY ESTER EXCHANGE

Fig. 1

REACTION SCHEME FOR INTRODUCING CARBOXYL GROUP INTO CARBON NANOTUBE

Fig. 2

REACTION SCHEME FOR METHYL ESTERIFICATION OF CARBON NANOTUBE CARBOXYLIC ACID

Fig. 3

REACTION SCHEME FOR POLYMERIZATION OF CARBON NANOTUBE CARBOXYLIC ACID METHYL ESTER AND GLYCERIN BY ESTER EXCHANGE

COMPOSITE AND METHOD OF MANUFACTURING THE SAME

FIELD OF THE INVENTION AND RELATED ART STATEMENT

The present invention relates to a composite formed by combining a carbon nanotube structure and ceramics and a method of manufacturing the same.

Carbon nanotubes (CNTs), with their unique shapes and characteristics, are being considered for various applications. A carbon nanotube has a tubular shape of one-dimensional nature which is obtained by rolling one or more graphene sheets composed of six-membered rings of carbon atoms into a tube. A carbon nanotube that is formed from one graphene sheet is called a single-wall nanotube (SWNT) while a carbon nanotube that is formed from graphene sheet layers is called a multi-wall nanotube (MWNT). Single-wall nanotubes are about 1 nm in diameter whereas multi-wall carbon nanotubes measure several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semiconductive because six-membered rings of carbon atoms in carbon nanotubes are arranged into a spiral. In addition, the electric conductivity of carbon nanotubes is very high and allows a current flow at a current density of 100 $MA/cm^2$ or more.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied researches that exploit the excellent characteristics of carbon nanotubes have been made heretofore extensively. To give a few examples, a probe of a scanning probe microscope, minute electron source, hydrogen storage, and diodes and transistors as electronic materials and electronic devices have been prototyped.

As described above, various applications for the carbon nanotubes are conceived. An example close to practical application includes an application of adding a carbon nanotube as a resin reinforcer or a conductive composite material.

A ceramics-carbon nanotube composite is one such composite. The ceramics have advantages such as thermal resistance, abrasive resistance, and lightweight properties. By adding the carbon nanotubes to the ceramics, a mechanical strength or thermal conductivity of the ceramics increases, and further electric conductivity can be imparted to the ceramics. Such a ceramics-carbon nanotube composite is disclosed in JP 2001-288626 A.

SUMMARY OF THE INVENTION

In JP 2001-288626 A, a $SiO_2$-carbon nanotube composite is obtained by mixing carbon nanotubes in an organopolysiloxane composition and calcining after application of the mixture. However, in the mixing process, organopolysiloxane adheres to a carbon nanotube surface, thus merely incidentally prompting contact between the carbon nanotubes surfaces and lowering the electric conductivity owing to a coarse electrical path. Further, the thermal conductivity is also lowered owing to a coarse network of the carbon nanotubes.

Therefore, the present invention has been made in view of the above circumstances and provides a ceramics composite with an enhanced mechanical strength and enhanced thermal or electric conductivity by constituting the composite using a carbon nanotube structure.

The above ceramics composite is achieved through the following present invention.

That is, according to the present invention, there is provided a composite formed by combining a carbon nanotube structure and ceramics characterized in that the carbon nanotube structure is constituted by chemically bonding functional groups bonded to multiple carbon nanotubes to mutually cross-link to construct a network structure.

The composite of the present invention has the carbon nanotubes mutually cross-linked, thus is different from a case of simple contact between the carbon nanotube surfaces, thereby providing a connection assuredly and stably. As a result, the thermal or electric conductivity between nanotubes is secured and the electric conductivity or the thermal conductivity which is a characteristic inherent in carbon nanotubes can be used. Therefore, the composite can be provided with satisfactory electric conductivity or thermal conductivity while retaining advantages of ceramics. In the composite of the present invention, the carbon nanotube structure preferably has multiple carbon nanotubes in a state of a network structure via multiple cross-linked sites.

Examples of the ceramics used for the composite of the present invention include oxide-based ceramics, nitride-based ceramics, carbide-based ceramics, boride-based ceramics, and silicide-based ceramics, and oxide-based ceramics are preferably because of its ease of production.

The carbon nanotube structure is preferably obtained by curing a liquid solution containing multiple carbon nanotubes to which functional groups are bonded to chemically bond the multiple functional groups bonded to the carbon nanotubes together for formation of a cross-linked site.

Of those, a preferable first structure for the cross-linked site is a structure cross-linking the multiple functional groups together with a cross-linking agent in the liquid solution, and the cross-linking agent is more preferably not self-polymerizable.

By forming the carbon nanotube structure through the above curing of the liquid solution, the cross-linked site where the carbon nanotubes are cross-linked together has a cross-linking structure, and the carbon nanotube structure can be networked. In the cross-linking structure, residues remaining after a cross-linking reaction of the functional groups are connected together using a connecting group which is a residue remaining after the cross-linking reaction of the cross-linking agent.

Alkoxide or the like, disclosed in JP 2002-234000 A, for example, can be used as a cross-linking agent which cross-links the carbon nanotubes together. However, if the cross-linking agent has a property of polymerizing with other cross-linking agents (self-polymerizability) such as the alkoxide, the cross-linking agents per se polymerize multiply into a state of a connected construction. The carbon nanotubes may be in a state of being dispersed in the construction of the cross-linking agents. Therefore, an actual density of the carbon nanotubes in the carbon nanotube structure becomes low.

On the other hand, if the cross-linking agent is not self-polymerizable, a gap between each of the carbon nanotubes can be controlled to a size of a cross-linking agent residue used. Therefore, a desired network structure of carbon nanotubes can be obtained with high duplicability. Further, reducing the size of the cross-linking agent residue can extremely narrow a gap between each of the carbon nanotubes both electrically and physically. In addition, carbon nanotubes in the structure can be densely structured.

Therefore, if the cross-linking agent is not self-polymerizable, using the carbon nanotube structure of the present invention as a filler assuredly can provide a skeleton with nanotubes bonded together in a short range. As a result, the carbon nanotube structure becomes an electrical and thermal network path having a satisfactory mechanical strength, electric conductivity, or thermal conductivity. In the present invention, the term "self-polymerizable" refers to a property of which the cross-linking agents may prompt a polymerization reaction with each other in the presence of other components such as water or in the absence of other components. On the other hand, "not self-polymerizable" means that the cross-linking agent has no such a property.

If a not self-polymerizable cross-linking agent is selected as the cross-linking agent, a cross-linked site, where carbon nanotubes are cross-linked to each other, in the composite of the present invention has primarily an identical cross-linking structure. Furthermore, the coupling group preferably employs a hydrocarbon as its skeleton, and the number of carbon atoms of the skeleton is preferably 2 to 10. Reducing the number of carbon atoms can shorten the length of a cross-linked site and sufficiently narrow a gap between carbon nanotubes as compared to the length of a carbon nanotube itself. As a result, a carbon nanotube structure of a network structure composed substantially only of carbon nanotubes can be obtained. Therefore, the composite of the present invention with excellent electric conductivity and thermal conductivity can be obtained.

Examples of the functional group include —OH, —COOH, —COOR (where R represents a substituted or unsubstituted hydrocarbon group), —COX (where x represents a halogen atom), —NH$_2$, and —NCO. A selection of at least one functional group from the group consisting of the above functional groups is preferable, and in such a case, a cross-linking agent, which may prompt a cross-linking reaction with the selected functional group, is selected as the cross-linking agent.

Further, examples of the preferable cross-linking agent include polyol, polyamine, polycarboxylic acid, polycarboxylate, polycarboxylic acid halide, polycarbodiimide, and polyisocyanate. A selection of at least one cross-linking agent from the group consisting of the above functional groups is preferable, and in such a case, a functional group, which may prompt a cross-linking reaction with the selected cross-linking agent, is selected as the cross-linking agent.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Examples of the particularly preferable functional group include —COOR (where R represents a substituted or unsubstituted hydrocarbon group). Introduction of a carboxyl group to carbon nanotubes is relatively easy, and the resultant substance (carbon nanotube carboxylic acid) is highly reactive. Therefore, after the formation of the substance, it is relatively easy to esterify the substance to convert its functional group into —COOR (where R represents a substituted or unsubstituted hydrocarbon group). The functional group easily prompts a cross-linking reaction and is suitable for formation of a coat.

A polyol can be exemplified as the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

In the cross-linked site in which multiple carbon nanotubes mutually cross-link, the functional group is —COOR (where R represents a substituted or unsubstituted hydrocarbon group). The cross-linked site is —COO(CH$_2$)$_2$OCO— in the case where ethylene glycol is used as the cross-linking agent. In the case where glycerin is used as the cross-linking agent, the cross-linked site is —COOCH$_2$CHOHCH$_2$OCO— or —COOCH$_2$CH(OCO—)CH$_2$OH— if two OH groups contribute to the cross-linking, and the cross-linked site is —COOCH$_2$CH(OCO—)CH$_2$OCO— if three OH groups contribute to the cross-linking. The chemical structure of the cross-linked site may be a chemical structure selected from the group consisting of the above four structures.

A second structure preferable as the structure of the cross-linked site is a structure formed by chemical bonding of multiple functional groups. More preferably, a reaction that causes the chemical bonding is any one of dehydration condensation, a substitution reaction, an addition reaction, and an oxidative reaction.

In the carbon nanotube structure, carbon nanotubes forms a cross-linked site by chemically bonding together functional groups bonded to the carbon nanotubes, to thereby form a network structure. Therefore, the size of the cross-linked site for bonding the carbon nanotubes becomes constant depending on the functional group to be bonded. Since a carbon nanotube has an extremely stable chemical structure, there is a low possibility that functional groups or the like excluding a functional group to modify the carbon nanotube are bonded to the carbon nanotube. In the case where the functional groups are chemically bonded together, the designed structure of the cross-linked site can be obtained, and the carbon nanotube structure can be homogeneous.

Furthermore, the functional groups are chemically bonded together, so that the length of the cross-linked site between the carbon nanotubes can be shorter than that in the case where the functional groups are cross-linked with a cross-linking agent. Therefore, the carbon nanotube structure is dense, and tends to readily produce an effect peculiar to a carbon nanotube.

In the carbon nanotube structure in the present invention, multiple carbon nanotubes form a network structure via multiple cross-linked sites. As a result, excellent characteristics of a carbon nanotube can be stably utilized unlike a material such as a mere carbon nanotube dispersion film or a resin dispersion film in which carbon nanotubes accidentally contact each other and are substantially isolated from each other.

The chemical bonding of multiple functional groups is preferably one selected from —COOCO—, —O—, —NHCO—, —COO—, and —NCH— in a condensation reaction. The chemical bonding is preferably at least one selected from —NH—, —S—, and —O— in a substitution reaction. The chemical bonding is preferably —NHCOO— in an addition reaction. The chemical bonding is preferably —S—S— in an oxidative reaction.

Examples of the functional group to be bonded to a carbon nanotube prior to the reaction include —OH—, —COOH, —COOR (where R represents a substituted or unsubstituted hydrocarbon group), —X, —COX (where X represents a halogen atom), —SH, —CHO, —OSO$_2$CH$_3$, —OSO$_2$(C$_6$H$_4$)CH$_3$—NH$_2$, and —NCO. It is preferable to select at least one functional group from the group consisting of the above functional groups.

Particularly preferable examples of the functional group include —COOH. A carboxyl group can be relatively easily introduced into a carbon nanotube. In addition, the resultant substance (carbon nanotube carboxylic acid) is highly reactive, easily causes a condensation reaction by using a dehydration condensing agent such as N-ethyl-N'-(3-dimethylaminopropyl)carbodiimide, and is thus suitable for forming a coat.

The multiple carbon nanotubes are preferably multi-wall carbon nanotubes with high electric conductivity in the mode from a view of forming a stable electrical and thermal path.

In the meantime, a method of manufacturing a composite of the present invention includes: a supplying step of supplying a surface of a substrate with a liquid solution containing multiple carbon nanotubes to which multiple functional groups are bonded; a cross-linking step of mutually cross-linking the multiple carbon nanotubes through chemical bonding of the multiple functional groups together to construct a network structure; and a combining step of combining the carbon nanotube structure and ceramics.

Conventionally, a structure for an effect of an interaction between carbon nanotubes formed by gathering the carbon nanotubes together and bringing the carbon nanotubes into contact with each other could not be used as a component of the composite. The reason for the above was that a connection was lost because the carbon nanotubes fluidized before solidification in an applying step upon sealing while a base material flowed in a connecting site between the carbon nanotubes.

Further, when applying a dispersion liquid in which the carbon nanotubes are dispersed in the liquid solution in advance, a problem arouse in that a connection by contact between the carbon nanotubes could not be achieved unless concentration of the carbon nanotubes was substantially high.

According to the present invention, in a supplying step of supplying a surface of a substrate with a liquid solution containing multiple carbon nanotubes to which functional groups are bonded (hereinafter, may be simply referred to as "cross-linking application liquid"), the cross-linking application liquid is supplied to a whole surface or a part of the surface of the substrate. Then, in the succeeding cross-linking step, the carbon nanotube structure in which multiple carbon nanotubes mutually cross-link to construct a network structure is formed. By going through the two steps, the structure per se of the carbon nanotube structure can be stabilized on the substrate surface. Then, the carbon nanotube structure is combined with the ceramics.

Examples of combining methods include a method of impregnating the carbon nanotube structure with the ceramics, and a method of combining the carbon nanotube structure and the ceramics by vapor deposition or sputtering.

Examples of the impregnating method include: a method involving infiltrating powdery ceramics into gaps of the network structure in the carbon nanotube structure through ultrasonic vibration or the like and sintering the resultant product; and a method involving applying to a carbon nanotube structure a liquid dispersion medium with dispersed ceramics powder or an organic paste that becomes ceramics after calcination, impregnating the medium or the paste into the carbon nanotube structure, and then calcining or sintering the resultant product.

Used as a ceramics material which forms oxide-based ceramics, nitride-based ceramics, carbide-based ceramics, boride-based ceramics, and silicide-based ceramics is a ceramics raw material containing one selected from the group consisting of: nonmetals such as O, N, B, C, and Si; metals such as Al, Pb, and Bi; transition metals such as Ti, Zr, Hf, and Y; alkali metals such as K; alkali earth metals such as Ca, Mg, and Sr; rare earth metals such as La and Ce; and halogens such as F and Cl. Of those, oxide-based ceramics such as SiO$_2$ and TiO$_2$ are suitable from a view of handling ease.

Next, in forming chemical bonding between functional groups constituting the carbon nanotube structure, a first method preferable for forming a cross-linked site is a method of cross-linking the functional groups with a cross-linking agent in the liquid solution. More preferably, the cross-linking agent is not self-polymerizable as described above.

In the method of manufacturing a composite of the present invention, examples of the functional group include —OH, —COOH, —COOR (where R represents a substituted or unsubstituted hydrocarbon group), —COX (where X represents a halogen atom), —NH$_2$, and —NCO. A selection of at least one functional group from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent from the group consisting of the above functional groups is preferable, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Particularly preferable examples of the functional group include —COOR (where R represents a substituted or unsubstituted hydrocarbon group). A carboxyl group can be relatively easily introduced into a carbon nanotube, and the resultant substance (carbon nanotube carboxylic acid) has high reactivity. Therefore, after the formation of the substance, it is relatively easy to esterify the substance to convert its functional group into —COOR (where R represents a substituted or unsubstituted hydrocarbon group). The functional group easily prompts a cross-linking reaction, and is suitable for the formation of a carbon nanotube structure.

In addition, a polyol may be the cross-linking agent corresponding to the functional group. A polyol is cured by a reaction with —COOR (where R represents a substituted or unsubstituted hydrocarbon group), and easily forms a cross-linked substance with high mechanical strength. Among polyols, each of glycerin and ethylene glycol reacts with the above functional groups well. Moreover, each of glycerin and ethylene glycol itself has high biodegradability, and applies a light load to an environment.

Further, a second preferable method of forming a cross-linked site is a method of chemically bonding multiple functional groups together.

From the above, the size of the cross-linked site, which bonds the carbon nanotubes together, becomes constant depending on the functional group to be bonded. A carbon nanotube has an extremely stable chemical structure, so that a possibility of bonding of functional groups or the like excluding the functional groups intended for a modification, is low. When chemically bonding the functional groups together, the designed structure of the cross-linked site can be obtained, providing a homogeneous carbon nanotube structure.

Further, functional groups are chemically bonded together and thus a length of the cross-linked site between the carbon nanotubes can be shortened compared to the case of cross-linking the functional groups together using a cross-linking agent. Therefore, the carbon nanotube structure becomes dense, and effects peculiar to carbon nanotubes are easily obtained.

Examples of a particularly preferable reaction, which chemically bonds the functional groups together, include a condensation reaction, a substitution reaction, an addition reaction, and an oxidative reaction.

In a method of manufacturing a composite of the present invention, the preferable functional group includes: at least one functional group selected from the group consisting of —COOR (where R represents a substituted or unsubstituted hydrocarbon group), —COOH, —COX (where X represents a halogen atom), —OH, —CHO—, and —$NH_2$ for the condensation reaction; at least one functional group selected from the group consisting of —$NH_2$, —X (where X represents a halogen atom), —SH, —OH, —$OSO_2CH_3$, and —$OSO_2(C_6H_4)CH_3$ for the substitution reaction; at least one functional group selected from the group consisting of —OH and —NCO for the addition reaction; and —SH for the oxidative reaction.

In a method of manufacturing a composite of the present invention, a molecule containing the functional groups may be bonded to carbon nanotubes to be chemically bonded at the exemplified functional group portion to construct the cross-linked site.

If the reaction is dehydration condensation, a condensing agent is preferably added. Further, the preferable functional group is at least one functional group selected from the group consisting of —COOR (where R represents a substituted or unsubstituted hydrocarbon group), —COOH, —COX (where X represents a halogen atom), —OH, —CHO, and —$NH_2$.

For example, —COOH is particularly preferably used as the functional group specifically used for the condensation reaction. Introduction of a carboxyl group into carbon nanotubes is relatively easy. Moreover, the resultant substance (carbon nanotube carboxylic acid) is highly reactive. Therefore, introduction of functional groups for forming a network structure to multiple places of one carbon nanotube is easy. In addition, the functional group easily causes a condensation reaction, thus being suitable for the formation of the carbon nanotube structure.

In the method of manufacturing a composite of the present invention, the liquid solution is preferably applied to the substrate as the cross-linking application liquid to form a coat. The liquid solution used in the supplying step can further contain a solvent at this time. The cross-linking agent or the additive can also serve as the solvent depending on the kind of the cross-linking agent or of the additive.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

Hereinafter, description of the present invention will be of a composite and a method of manufacturing the same, separately.

[Composite]

A composite of the present invention employs a carbon nanotube structure in which multiple carbon nanotubes mutually cross-link to construct a network structure, so that the composite has a high mechanical strength. In addition, electrical and thermal paths are formed in the composite to thereby impart superior electric and thermal conductivities to the composite. Mixing the composite with ceramics provides a material with an improved mechanical strength, improved electrical characteristics, or improved thermal characteristics, while maintaining excellent characteristics of ceramics.

[Ceramics]

Ceramics to be combined with a carbon nanotube structure is not particularly limited, and can be appropriately selected depending on applications. Specific examples of the ceramics include oxide-based ceramics, nitride-based ceramics, carbide-based ceramics, boride-based ceramics, and silicide-based ceramics. However, oxide-based ceramics (for instance, $SiO_2$ or $TiO_2$) are preferable in terms of ease of manufacture when converting a ceramic material into ceramics.

<Carbon Nanotube Structure>

In the present invention, "carbon nanotube structure" refers to a configuration having a network structure in which multiple carbon nanotubes are cross-linked to each other. As long as a structure of carbon nanotubes can be formed to construct a mutually cross-linked network structure, the carbon nanotube structure may be formed through any method. However, with a structure manufactured through a method of manufacturing a composite of the present invention described later, a high performance composite component can be easily manufactured and obtained, and uniformization or control of characteristics is also easy.

A first structure of the carbon nanotube structure used as a composite of the present invention manufactured through a method of manufacturing a composite of the present invention described later is obtained through the steps of:

curing a liquid solution containing carbon nanotubes that have a functional group, and a cross-linking agent that prompts a cross-linking reaction with the functional group (cross-linking application liquid); and forming a cross-linked site through a cross-linking reaction of the functional group, which the carbon nanotubes have, and the cross-linking agent. Further, a second structure of the carbon nanotube structure is obtained by forming the cross-linked site through chemical bonding the functional groups of the carbon nanotubes together.

The carbon nanotube structure used in the composite of the present invention can be also a carbon nanotube structure layer having a layered structure. The carbon nanotube structure layer of the composite of the present invention is described below with reference to an example in which the carbon nanotube structure manufacturing method of the present invention is employed. If not particularly described, any structure of the cross-linked site may be adapted for the item.

(Carbon Nanotube)

Carbon nanotubes, which are the main component in the present invention, may be single-wall carbon nanotubes or multi-wall carbon nanotubes having two or more layers. Whether one or both types of carbon nanotubes are used (and, if only one type is to be used, which type is chosen) is selected appropriately taking into consideration the application of the composite or the cost.

For the carbon nanotube structure layer to bear a function of electric conductivity, for example, multi-wall carbon nanotubes are preferably used for the multiple carbon nanotubes in the layer, allowing suppression of a resistance loss due to being networked. Electrically conductive single-wall carbon nanotubes can be also used. However, single-wall carbon nanotubes are manufactured as a mixture of semiconductive and conductive carbon nanotubes and extracting conductive carbon nanotubes is difficult. Therefore, use of multi-wall carbon nanotubes, of which conductive carbon nanotubes are mainly produced, is preferable for the carbon nanotube structure layer to bear the function of electric conductivity.

Carbon nanotubes in the present invention include ones that are not exactly shaped like a tube, such as a carbon nanohorn (a horn-shaped carbon nanotube whose diameter is continuously increased from one end toward the other end) which is a variant of a single-wall carbon nanotube, a carbon nanocoil (a coil-shaped carbon nanotube forming a spiral when viewed in entirety), a carbon nanobead (a spherical bead made of amorphous carbon or the like with its center pierced by a tube), a cup-stacked nanotube, and a carbon nanotube with its periphery covered with a carbon nanohorn or amorphous carbon.

Furthermore, carbon nanotubes in the present invention may be ones that contain some substance inside, such as a metal-containing nanotube which is a carbon nanotube containing metal or the like, and a peapod nanotube which is a carbon nanotube containing fullerene or metal-containing fullerene.

As described above, the present invention can employ carbon nanotubes of any mode, including common carbon nanotubes, variants of common carbon nanotubes, and carbon nanotubes with various modifications, without a problem in terms of reactivity. Therefore, the concept of "carbon nanotube" in the present invention encompasses all of the above.

These carbon nanotubes are conventionally synthesized through a known method, such as arc discharge, laser ablation, and CVD, and the present invention can employ any of the methods. However, arc discharge in a magnetic field is preferable from the viewpoint of synthesizing highly pure carbon nanotubes.

Carbon nanotubes used in the present invention preferably have a diameter of 0.3 nm or more and 100 nm or less. If the diameter of the carbon nanotubes exceeds this upper limit, the synthesis becomes difficult and costly. A more preferable upper limit of the diameter of the carbon nanotubes is 30 nm or less.

In general, the lower limit of carbon nanotube diameter is about 0.3 nm from a structural standpoint. However, too small diameter could lower the synthesis yield. It is therefore preferable to set the lower limit of carbon nanotube diameter to 1 nm or more, more preferably 10 nm or more.

The carbon nanotubes used in the present invention preferably have a length of 0.1 µm or more and 100 µm or less. If the length of the carbon nanotubes exceeds this upper limit, the synthesis becomes difficult or requires a special method raising cost. On the other hand, if the length of the carbon nanotubes falls short of this lower limit, the number of cross-link bonding points per carbon nanotube is reduced, which is not preferable. A more preferable upper limit of carbon nanotube length is 10 µm or less and a more preferable lower limit of carbon nanotube length is 1 µm or more.

The appropriate carbon nanotube content in the cross-linking application liquid varies depending on the length and thickness of carbon nanotubes, whether single-wall carbon nanotubes or multi-wall carbon nanotubes are used, the type and amount of functional groups in the carbon nanotubes, the type and amount of cross-linking agents, whether there is a solvent or other additive used, and if used, the type and amount of the solvent or additive, etc. The carbon nanotube concentration in the liquid solution should be high enough to form an excellent carbon nanotube structure after curing but not too high to make the application difficult.

Specifically, the ratio of carbon nanotubes to the entire application liquid excluding the mass of the functional groups is about 0.01 to 10 g/l, preferably about 0.1 to 5 g/l, and more preferably about 0.5 to 1.5 g/l, although, as mentioned above, the ranges could be different if the parameters are different.

If the purity of carbon nanotubes to be used is not high enough, it is desirable to raise the purity by refining the carbon nanotubes prior to preparation of the cross-linking application liquid. In the present invention, the higher the carbon nanotube purity, the more preferable. Specifically, the purity is preferably 90% or higher, more preferably, 95% or higher. When the purity is low, cross-linking agents are cross-linked to carbon products such as amorphous carbon and tar, which are impurities. This could change the cross-linking distance between carbon nanotubes, leading to a failure in obtaining desired characteristics. No particular limitation is put on how carbon nanotubes are refined, and any known refining method can be employed.

(Functional Group 1)

According to the present invention, carbon nanotubes can have any functional group as long as the functional groups chosen can be added to the carbon nanotubes chemically and can prompt a cross-linking reaction with some cross-linking agent. Specific examples of such functional groups include —COOR, —COX, —MgX, —X (where X represents halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR$_{13}$ (where R, R$^1$, R$^2$, and R' each represent a substituted or unsubstituted hydrocarbon group). Note that employable functional groups are not limited to those examples.

Of those, a selection of at least one functional group selected from the group consisting of —OH, —COOH, —COOR (where R represents a substituted or unsubstituted hydrocarbon group), —COX (where X represents a halogen atom), —NH$_2$, and —NCO is preferable. In that case, a cross-linking agent, which can prompt a cross-linking reaction with the selected functional group, is selected as the cross-linking agent.

In particular, —COOR (where R represents a substituted or unsubstituted hydrocarbon group) is particularly preferable. The reason is that a carboxyl group can be relatively easily introduced into a carbon nanotube, because the resultant substance (carbon nanotube carboxylic acid) can be easily introduced as a functional group by esterifying the substance, and because the substance has good reactivity with a cross-linking agent.

R in the functional group —COOR is a substituted or unsubstituted hydrocarbon group, and is not particularly limited. However, R is preferably an alkyl group having 1 to 10 carbon atoms, more preferably an alkyl group having 1 to 5 carbon atoms, and particularly preferably a methyl group or an ethyl group in terms of reactivity, solubility, viscosity, and ease of use as a solvent of a paint.

The appropriate amount of functional groups introduced varies depending on the length and thickness of carbon nanotubes, whether single-wall carbon nanotubes or multi-wall carbon nanotubes are used, the type of functional groups, the use of composite obtained, etc. From the viewpoint of the strength of the cross-linked substance obtained, namely, the strength of the cross-linked substance, a preferable amount of functional groups introduced is large enough to add two or more functional groups to each carbon nanotube.

A method of introducing functional groups into carbon nanotubes will be explained in a section below titled [Method of Manufacturing a Composite].

(Cross-Linking Agent)

Any cross-linking agent that is capable of prompting a cross-linking reaction with the functional groups of the carbon nanotubes can be used when cross-linking the functional groups bonded to the carbon nanotubes together. In other words, the types of cross-linking agents that can be chosen are limited to a certain degree by the types of the functional groups. In addition, the condition of curing (heating, UV irradiation, visible light irradiation, natural curing, etc.) as a result of the cross-linking reaction is naturally determined by the combination of those parameters.

Specific examples of the preferable cross-linking agents include polyol, polyamine, polycarboxylic acid, polycarboxylate, polycarboxylic acid halide, polycarbodiimide, and polyisocyanate. A selection of at least one cross-liking agent from the group consisting of the above functional groups is preferable, and in that case, a functional group which can prompt a reaction with the cross-linking agent chosen is selected as the functional group.

At least one functional group and one cross-linking agent are particularly preferably selected respectively from the group exemplified as the preferable functional group and the group exemplified as the preferable cross-linking agent, so that a combination thereof may prompt a cross-linking reaction with each other. The following Table 1 lists the combinations of the functional group of the carbon nanotubes and the corresponding cross-linking agent, which can prompt a cross-linking reaction, along with curing conditions of the combinations.

TABLE 1

| Functional group of carbon nanotube | Cross-linking agent | Curing condition |
|---|---|---|
| —COOR | polyol | heat curing |
| —COX | polyol | heat curing |
| —COOH | polyamine | heat curing |
| —COX | polyamine | heat curing |
| —OH | polycarboxylate | heat curing |
| —OH | polycarboxylic acid halide | heat curing |
| —NH$_2$ | polycarboxylic acid | heat curing |
| —NH$_2$ | polycarboxylic acid halide | heat curing |
| —COOH | polycarbodiimide | heat curing |
| —OH | polycarbodiimide | heat curing |
| —NH$_2$ | polycarbodiimide | heat curing |
| —NCO | polyol | heat curing |
| —OH | polyisocyanate | heat curing |
| —COOH | ammonium complex | heat curing |
| —COOH | cis-platin | heat curing |

*R represents a substituted or unsubstituted hydrocarbon group
*X represents a halogen Of those combinations, preferable is the combination of —COOR (where R represents a substituted or unsubstituted hydrocarbon group) with good reactivity on a functional group side and polyol, polyamine, an ammonium complex, congo red, and cis-platin, that form a robust cross-linked substance with ease. The terms "polyol", "polyamine", and "ammonium complex", in the present invention are genetic names for organic compounds each having two or more OH groups and NH$_2$ groups. Of those, polyol having 2 to 10 (more preferably 2 to 5) carbon atoms and 2 to 22 (more preferably 2 to 5) OH groups is preferable in terms of cross-linkability, solvent compatibility when an excessive amount of the polyol is charged, processability of waste liquid after a reaction by virtue of biodegradability (environment aptitude), yield of polyol synthesis, and so on. In particular, the number of carbon atoms is preferably lower within the above range because a space between carbon nanotubes in a carbon nanotube structure can be narrowed to bring the carbon nanotubes into substantial contact with each other (to bring the carbon nanotubes close to each other). Specifically, glycerin and ethylene glycol are particularly preferable, and it is preferable to use one or both of glycerin and ethylene glycol as a cross-linking agent.

From another perspective, the cross-linking agent is preferably a not self-polymerizable cross-linking agent. Examples of the polyols such as glycerin, and ethylene glycol, and in addition, butenediol, hexynediol, hydroquinone, and naphthalenediol are not self-polymerizable cross-linking agents. More generally, a prerequisite of the not self-polymerizable cross-linking agent is to be without a pair of functional groups, which can prompt a polymerization reaction with each other, in itself. On the other hand, examples of a self-polymerizable cross-linking agent include one that has a pair of functional groups, which can prompt a polymerization reaction with each other (alkoxide, for example).

Further, the second method may also be adopted in which the carbon nanotube structure constructs a network structure of mutually cross-linked carbon nanotubes through a cross-linked site formed by chemically bonding multiple functional groups, in which at least one end of the cross-linked site is bonded to different carbon nanotubes respectively.

(Functional Group 2)

In this case, as long as reacting themselves with some additive, the functional group is not particularly limited, and any functional group can be selected. Specific examples of the functional group include —COOR, —COX, —MgX—, —X (where X represents a halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (where R, R$^1$, R$^2$, and R$^3$ each represent a substituted or unsubstituted hydrocarbon group), but are not limited to those.

Of those, the preferable functional group includes: at least one selected from the group consisting of —COOR (where R represents a substituted or unsubstituted hydrocarbon group), —COOH, —COX (where X represents a halogen atom), —OH, —CHO—, and —NH$_2$ for the condensation reaction; at least one selected from the group consisting of —NH$_2$, —X (where X represents a halogen atom), —SH, —OH, —OSO$_2$CH$_3$, and —OSO$_2$(C$_6$H$_4$)CH$_3$ for the substitution reaction; at least one selected from the group consisting of —OH and —NCO for the addition reaction; and —SH for the oxidative reaction.

Further, bonding a molecule, which partially contains those functional groups, with the carbon nanotubes to chemically bond at a preferable functional group portion exemplified above is also possible. Even in this case, a functional group with large molecular weight to be bonded to the carbon nanotubes is bonded as intended, enabling a control of a length of the cross-linked site.

(Additive)

Any additive that is capable of making the functional groups of the carbon nanotubes react with each other can be added in the cross-linking application liquid. In other words, the types of additives that can be chosen are limited to a certain degree by the types of the functional groups and the reaction type. In addition, the condition of curing (heating, UV irradiation, visible light irradiation, natural curing, etc.) as a result of the reaction is naturally determined by the combination of those parameters.

(Condensing Agent)

To give specific examples of preferable additives, an acid catalyst or a dehydration condensing agent, for example, sulfuric acid, N-ethyl-N'- (3-dimethylaminopropyl)carbodiimide, and dicyclohexyl carbodiimide, is preferred as a condensing agent. Desirably, at least one condensing agent is chosen from the group consisting of the above. The functional groups that can prompt a reaction with each other using the selected condensing agent are selected.

(Base)

A base is an indispensable component of the cross-linking application liquid in a substitution reaction. An arbitrary base is chosen in accordance with the degree of acidity of hydroxyl groups.

Specific examples of the preferable base include at least one selected from the group consisting of sodium hydroxide, potassium hydroxide, pyridine, and sodium ethoxide. A functional group that prompts a substitution reaction among the functional groups using the selected base is selected as the functional group.

It is particularly preferable to select a combination of functional groups such that at least two functional groups from each of the groups exemplified as the preferable functional groups that can prompt a reaction with each other. Listed in Table 2 below are functional groups of carbon nanotubes and names of the corresponding reactions.

An addition reaction does not necessarily need an additive. In an oxidative reaction, an additive is not necessarily needed but adding an oxidative reaction accelerator is preferable. A specific example of the accelerator is iodine.

TABLE 2

| Bonding site | Functional group of carbon nanotube (A) | Functional group of carbon nanotube (B) | Reaction |
|---|---|---|---|
| —COOCO— | —COOH | — | Dehydration condensation |
| —S—S— | —SH | — | Oxidative reaction |
| —O— | —OH | — | Dehydration condensation |
| —NH—CO— | —COOH | —NH$_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —NH$_2$ | Dehydration condensation |
| —NH— | —NH$_2$ | —X | Substitution reaction |
| —S— | —SH | —X | Substitution reaction |
| —O— | —OH | —X | Substitution reaction |
| —O— | —OH | —OSO$_2$CH$_3$ | Substitution reaction |
| —O— | —OH | —OSO$_2$(C$_6$H$_4$)CH$_3$ | Substitution reaction |
| —NH—COO— | —OH | —N=C=O | Addition reaction |

*R represents a substituted or unsubstituted hydrocarbon group
*X represents a halogen The content of a cross-linking agent or of an additive for bonding functional groups in the cross-linking application liquid varies depending on the type of the cross-linking agent (including whether the cross-linking agent is self-polymerizable or not self-polymerizable) and the type of the additive for bonding functional groups. In addition, the content also varies depending on the length and thickness of a carbon nanotube, whether the carbon nanotube is of a single-wall type or a multi-wall type, the type and amount of a functional group of the carbon nanotube, the presence or absence, type, and amount of a solvent and other additives, and the like. Therefore, the content can not be determined uniquely. In particular, for example, glycerin or ethylene glycol can also provide characteristics of a solvent because viscosity of glycerin or ethylene glycol is not so high, and thus an excessive amount of glycerin or ethylene glycol can be added.

(Other Additive)

The cross-linking application liquid may contain various additives including a solvent, a viscosity modifier, a dispersant, and a cross-linking accelerator. A solvent is added when satisfactory application of the cross-linking application liquid is not achieved with solely the cross-linking agents or the additive for bonding the functional groups. Any solvent can be appropriately employed without particular limitation as long as it is suitable for the cross-linking agents used. Specific examples of employable solvents include: organic solvents such as methanol, ethanol, isopropanol, n-propanol, butanol, methyl ethyl ketone, toluene, benzene, acetone, chloroform, methylene chloride, acetonitrile, diethyl ether, and tetrahydrofuran (THF); water; acidic aqueous solutions; and alkaline aqueous solutions. A solvent as such is added in an amount that is not particularly limited but determined appropriately by taking into consideration the ease of applying the cross-linking application liquid.

A viscosity modifier is added when satisfactory application of the cross-linking application liquid is not achieved with solely the cross-linking agents or the additive for bonding the functional groups. Any viscosity modifier can be appropriately employed without any limitation as long as it is suitable for the cross-linking agents used. Specific examples of employable viscosity modifiers include methanol, ethanol, isopropanol, n-propanol, butanol, methyl ethyl ketone, toluene, benzene, acetone, chloroform, methylene chloride, acetonitrile, diethyl ether, and THF.

Some of these viscosity modifiers have the function of a solvent when added in a certain amount, and it is meaningless to clearly distinguish viscosity modifiers from solvents. A viscosity modifier as such is added in an amount that is not particularly limited but determined by taking into consideration the ease of applying the cross-linking application liquid.

A dispersant is added to the cross-linking application liquid in order to maintain the dispersion stability of the carbon nanotubes or the cross-linking agents or the additive for bonding and the functional groups in the application liquid. Various known surfactants, water-soluble organic solvents, water, acidic aqueous solutions, alkaline aqueous solutions, etc. can be employed as a dispersant. However, a dispersant is not always necessary. In addition, depending on the use of the composite formed, the presence of impurities such as a dispersant in the composite may not be desirable. In such case, a dispersant is not added at all, or is added in a very small amount.

(Method of Preparing the Cross-Linking Application Liquid)

A method of preparing the cross-linking application liquid is described next.

The cross-linking application liquid is prepared by mixing, as needed, carbon nanotubes that have functional groups with a cross-linking agent that prompts a cross-linking reaction with the functional groups or an additive that causes the functional groups to form chemical bonds among themselves (mixing step). The mixing step may be preceded by an addition step in which the functional groups are introduced into the carbon nanotubes.

If carbon nanotubes having functional groups are used as a starting material, the preparation starts with the mixing step. If normal carbon nanotubes themselves are used as a starting material, the preparation starts with the addition step.

The addition step is a step of introducing desired functional groups into carbon nanotubes. A method of introducing functional groups varies depending on the type of functional group. One method is to add a desired functional group directly, and another method is to introduce a functional group that is easily added and then substitute the whole functional group or a part thereof or add a different functional group to the former functional group in order to obtain the target functional group.

Still another method is to apply a mechanochemical force to a carbon nanotube to break or modify only a small portion of a graphene sheet on the surface of the carbon nanotube and introduce various functional groups from the broken or modified portion.

Cup-stacked carbon nanotubes, which have many defects on the surface from manufacture, and carbon nanotubes that are formed by vapor phase growth enable relatively easy introduction of functional groups. On the other hand, carbon nanotubes that have a perfect graphene sheet structure exert the carbon nanotube characteristics more effectively and are easier to control the characteristics. Consequently, it is particularly preferable to use a multi-wall carbon nanotube so that defects formed as many as appropriate on its outermost layer are used to bond functional groups for cross-linking while the inner layers having less structural defects exert the carbon nanotube characteristics.

There is no particular limitation for the addition step and any known method can be employed. Various addition methods disclosed in JP 2002-234000 A may be also employed in the present invention depending on the purpose.

A description is given on a method of introducing —COOR (where R represents a substituted or unsubstituted hydrocarbon group), a particularly preferable functional group among the functional groups listed above. To introduce —COOR (where R represents a substituted or unsubstituted hydrocarbon group) into carbon nanotubes, carboxyl groups may be (a) added to the carbon nanotubes once, and then (b) esterified.

(a) Addition of Carboxyl Group

To introduce carboxyl groups into carbon nanotubes, carboxyl groups are refluxed together with an acid having an oxidizing effect. This procedure is relatively easy and is preferable since carboxyl groups which are highly reactive can be added to carbon nanotubes. A brief description of the operation is given below.

Examples of an acid having an oxidizing effect include concentrated nitric acid, hydrogen peroxide solution, a mixed solution of sulfuric acid and nitric acid, and aqua regia. When concentrated nitric acid is used, in particular, concentration thereof is preferably 5 mass % or higher, more preferably, 60 mass % or higher.

A normal reflux method can be employed. The temperature is preferably set to a level near the boiling point of the acid used. When concentrated nitric acid is used, for instance, the temperature is preferably set to 120 to 130° C. The reflux preferably lasts 30 minutes to 20 hours, more preferably, 1 hour to 8 hours.

Carbon nanotubes to which carboxyl groups are added (carbon nanotube carboxylic acid) are produced in the reaction liquid after the reflux. The reaction liquid is cooled down to room temperature and then is subjected to a separation operation or washing as necessary, thereby obtaining the target carbon nanotube carboxylic acid.

(b) Esterification

The target functional group —COOR (where R represents a substituted or unsubstituted hydrocarbon group) can be introduced by adding an alcohol to the obtained carbon nanotube carboxylic acid and dehydrating for esterification.

The alcohol used for the esterification is determined according to R in the formula of the functional group. That is, if R represents $CH_3$, alcohol is methanol, and if R represents $C_2H_5$, alcohol is ethanol. A catalyst is generally used in the esterification, and a conventionally known catalyst such as sulfuric acid, hydrochloric acid, and toluenesulfonic acid can also be used in the present invention. A use of the sulfuric acid as a catalyst is preferable from a view of not prompting a side reaction in the present invention.

The esterification may be conducted by adding an alcohol and a catalyst to carbon nanotube carboxylic acid and refluxing at an appropriate temperature for an appropriate time period. A temperature condition and a time period condition depend on type of a catalyst, type of alcohol, or the like and cannot be simply determined, but a reflux temperature near the boiling point of the alcohol used is preferable. A temperature range of 60 to 70° C. is preferable for methanol, for example. Further, a time period is preferably in a range of 1 to 20 hours, more preferably in a range of 4 to 6 hours.

Carbon nanotubes with the functional group —COOR (where R represents a substituted or unsubstituted hydrocarbon group) added can be obtained by separating a reaction product from a reaction liquid after esterification and washing as required.

The mixing step is a step of mixing, as required, a cross-linking agent prompting a cross-linking reaction with the functional groups or an additive for bonding the functional groups with the carbon nanotubes which contain functional groups to prepare the cross-linking application liquid. In the mixing step, other components described in the aforementioned section titled [Composite] are added, in addition to the carbon nanotubes containing functional groups and the cross-linking agents. Then, preferably, an amount of a solvent or a viscosity modifier is adjusted considering applicability to prepare the cross-linking application liquid just before application.

A simple stirring with a spatula and stirring with an agitator of an agitating blade type, a magnetic stirrer, and a stirring pump may be used. However, to achieve higher degree of uniformity in dispersion of the carbon nanotubes to enhance storage stability while fully extending a network structure by cross-linking of the carbon nanotubes, an ultrasonic disperser or a homogenizer may be used for powerful dispersion. However, when using a stirring device with a strong shear force of stirring such as a homogenizer, there arises a risk of cutting and damaging the carbon nanotubes contained, thus the device may be used for a very short time period.

A carbon nanotube structure layer is formed by supplying the cross-linking application liquid described above to the substrate surface and curing. A supplying method and a curing method are described in detail in a section below titled [Method of Manufacturing a Composite] described later.

The carbon nanotube structure layer according to the present invention is in a state in which carbon nanotubes are being networked. In detail, the carbon nanotube structure layer is cured into a matrix shape, and carbon nanotubes are connected to each other via cross-linked sites. Therefore, characteristics of carbon nanotubes per se such as high electron- and hole-transmission characteristics can be exerted sufficiently. In other words, the carbon nanotube structure layer has carbon nanotubes that are tightly connected to each other, contains no other binders and the like, and is thus substantially composed only of carbon nanotubes, so that intrinsic characteristics of carbon nanotubes are fully utilized.

A thickness of the carbon nanotube structure layer of the present invention can be widely selected from being extra thin to being thick according to an application. Lowering a content of the carbon nanotubes in the cross-linking application liquid used (simply, lowering the viscosity of the solution by diluting) and applying in a thin film form allows an extra thin structure film to be obtained. Similarly, raising a content of the carbon nanotubes allows a thick structure to be obtained. Further, repeating the application allows an even thicker coat to be obtained. Formation of an extra thin coat from a thickness of about 10 nm is possible, and formation of a thick coat without an upper limit is possible through repeated application. A possible film thickness with one application is about 5 µm. Further, not restricting to application, a structure can be also obtained by supplying the cross-linking application liquid to a mold or the like.

In the carbon nanotube structure layer, a site where the carbon nanotubes cross-link together, that is, the cross-linked site formed by a cross-linking reaction between the functional groups of the carbon nanotubes and the cross-linking agents has a cross-linking structure. In the cross-linking structure, residues of the functional groups remaining after a cross-linking reaction are connected together with a connecting group, which is a residue of the cross-linking agent remaining after the cross-linking reaction.

As described, the cross-linking agent, which is a component of the cross-linking application liquid, is preferably not self-polymerizable. If the cross-linking agent is not self-polymerizable, the carbon nanotube structure layer finally manufactured would be constructed from a residue of only one cross-linking agent. The gap between the carbon nanotubes to be cross-linked can be controlled to a size of the residue of the cross-linking agent used, thereby providing a desired network structure of the carbon nanotubes with high duplicability. Further, multiple cross-linking agents are not present between the carbon nanotubes, thus enabling an enhancement of a substantial density of the carbon nanotubes in the carbon nanotube structure. Further, by reducing a size of the residue of the cross-linking agent, a gap between each of the carbon nanotubes can be constructed in an extremely close state electrically and physically (carbon nanotubes are substantially in direct contact with each other).

When forming the carbon nanotube structure with a cross-linking application liquid prepared by selecting a single functional group of the carbon nanotubes and a single not-self-polymerizable cross-linking agent, the cross-linked site of the layer will have identical cross-linking structure (Example 1). Further, even when forming the carbon nanotube structure layer with a cross-linking application liquid prepared by selecting multiple types of functional groups of the carbon nanotubes and/or multiple types of not self-polymerizable cross-linking agents, the cross-linked site of the layer will mainly have a cross-linking structure based on a combination of the functional group and the not self-polymerizable cross-linking agent mainly used (Example 2).

On the contrary, when forming the carbon nanotube structure layer with a cross-linking application liquid prepared by selecting self-polymerizable cross-linking agents, without regard to whether the functional groups and the cross-linking agents are of single or multiple types, the cross-linked site of the layer will not mainly have a specific cross-linking structure. The cross-linked site will be in a state in which numerous connecting groups with different connecting (polymerization) numbers of the cross-linking agents coexist.

In other words, by selecting not self-polymerizable cross-linking agents, the cross-linked sites, where the carbon nanotubes of the carbon nanotube structure layer cross-link together, bond with the functional group through a residue of only one cross-linking agent, thus forming mainly identical cross-linking structure. "Mainly identical" here is a concept including a case with all of the cross-linked sites having identical cross-linking structure as described above (Example 1), as well as a case with the cross-linking structure based on a combination of the functional group and the not self-polymerizable cross-linking agent mainly used becomes a main structure with respect to the whole cross-linked site as described above (Example 2).

A "ratio of identical cross-linked sites" with respect to the whole cross-linked sites will not have a uniform lower limit defined. The reason is that a case of imparting a functional group or a cross-linking structure with a different aim from formation of a carbon nanotube network may be assumed for example, when referring as "mainly identical". However, in order to actualize high electrical or physical characteristics inherent in carbon nanotubes with a strong network, a "ratio of identical cross-linked sites" with respect to the total cross-linked sites is preferably 50% or more, more preferably 70% or more, further more preferably 90% or more, and most preferably all identical, based on numbers. Those number ratios can be determined through a method of measuring an intensity ratio of an absorption spectrum corresponding to the cross-linking structure with an infrared spectrum or the like.

As described, if a carbon nanotube structure layer has cross-linked sites where carbon nanotubes cross-link with mainly identical cross-linking structures, a uniform network of the carbon nanotubes can be formed in a desired state. In addition, the carbon nanotube network can be constructed with homogeneous, satisfactory, and expected electrical or physical characteristics and high duplicability.

Further, the connecting group preferably contains hydrocarbon for a skeleton thereof. "Hydrocarbon for a skeleton" here refers to a main chain portion of the connecting group consisting of hydrocarbon, the main portion of the connecting group contributing to connecting residues of the functional groups of carbon nanotubes to be cross-linked remaining after a cross-linking reaction together. A side chain portion, where hydrogen of the main chain portion is substituted by another substituent, is not considered. Obviously, it is more preferable that the whole connecting group consists of hydrocarbon.

A number of carbon atoms in the hydrocarbon is preferably 2 to 10, more preferably 2 to 5, and further more preferably 2 to 3. The connecting group is not particularly limited as long as it is divalent or more.

In the cross-linking reaction of the functional group —COOR (where R represents a substituted or unsubstituted hydrocarbon) and ethylene glycol, exemplified as a preferable combination of the functional group of carbon nanotubes and the cross-linking agent, the cross-linked site, where multiple carbon nanotubes cross-link to each other, becomes —COO($CH_2$)$_2$OCO—.

Further, in the cross-linking reaction of the functional group —COOR (where R represents a substituted or unsubstituted hydrocarbon) and glycerin, the cross-linked site, where multiple carbon nanotubes cross-link to each other, becomes —COOCH$_2$CHOHCH$_2$OCO— or —COOCH$_2$CH(OCO—)CH$_2$OH if two OH groups contribute in the cross-link, and —COOCH$_2$CH(OCO—)CH$_2$OCO— if three OH groups contribute in the cross-link.

Furthermore, a carbon nanotube structure in the present invention may be in a state where carbon nanotubes are networked via cross-linked sites formed by chemical bonding of multiple functional groups at least one end of each of which is bonded to a different carbon nanotube. The carbon nanotube structure is condensed in a matrix shape, and carbon nanotubes are connected to each other via cross-linked sites. Therefore, characteristics of carbon nanotubes per se such as high electron- and hole-transmission characteristics can be exerted sufficiently. That is, the carbon nanotube structure has carbon nanotubes tightly connected to each other, is free of other binders, and is thus composed substantially only of carbon nanotubes. Therefore, intrinsic characteristics of carbon nanotubes can be utilized.

A carbon nanotube structure layer in the present invention can be selected from a wide range from an extra-thin carbon nanotube structure layer to a thick carbon nanotube structure layer depending on applications and desired electrical characteristics. Lowering the carbon nanotube content in the cross-linking solution to be used (simply, lowering the viscosity of the solution through dilution) and applying the solution in a thin film form result in the formation of an extra-thin structure film. Similarly, raising the carbon nanotube content results in the formation of a thick structure. Moreover, repeated application can provide an even thicker coat. A structure film with a thickness of approximately 10 nm is adequate for an extra-thin structure layer, and repeated application can form a thick coat with no upper limit on its thickness. A film thickness that can be obtained by one application is approximately 2 µm. Furthermore, injection of a cross-linking application liquid with an adjusted content or the like into a mold to be bonded can provide a desired shape.

In the carbon nanotube structure, sites where the carbon nanotubes cross-link to each other, or cross-linked sites formed by reactions between the functional groups of the carbon nanotubes are connected by aggregates after the reactions between the functional groups to form a cross-linked structure.

Since functional groups are allowed to react with each other to form a cross-linked site, a substantial carbon nanotube density in a carbon nanotube structure can be increased. Furthermore, reducing the size of a functional group can extremely narrow a gap between carbon nanotubes both electrically and physically. As a result, characteristics of a carbon nanotube alone may be easily exploited. A cross-linked site where carbon nanotubes in a nanotube structure layer cross-link is a chemical bond of functional groups, so that structures form mainly identical cross-linked structure. The phrase "mainly identical" refers to a concept including the case where all cross-linked sites form identical cross-linked structure. The concept also includes the case where cross-linked structures formed by chemical bonding of functional groups become main structures with respect to the whole cross-linked sites.

As described above, if the carbon nanotube structure layer has cross-linked sites, where carbon nanotubes cross-link together with mainly identical cross-linking structures, a uniform network of carbon nanotubes can be brought into a desired state. Therefore, electric and physical carbon nanotube characteristics that are homogeneous and excellent can be obtained. Furthermore, expected electrical or physical characteristics can be obtained with high duplicability.

As described above, in the composite of the present invention, if a carbon nanotube structure layer is formed in a state where multiple carbon nanotubes construct a network structure via multiple cross-linked sites, the contact and arrangement conditions of the carbon nanotubes do not become unstable unlike a mere carbon nanotube dispersion film. Therefore, characteristics peculiar to carbon nanotubes can be stably exerted, which include: electrical characteristics such as high electron- and hole-transmission characteristics; physical characteristics such as thermal conductivity and toughness; and light absorption characteristics.

In the composite of the present invention, another layer may be formed. For example, placing an adhesive layer between the surface of the substrate and the carbon nanotube structure layer for enhancing adhesiveness therebetween can improve the adhesive strength of the carbon nanotube structure layer, and is thus preferable. A method of forming an adhesive layer and other details will be described in the section of [Method of Manufacturing a Composite].

As described above, the carbon nanotube structure of this embodiment is formed in a state where multiple carbon nanotubes construct a network structure via multiple cross-linked sites. Therefore, the contact and arrangement conditions of the carbon nanotubes do not become unstable unlike a mere carbon nanotube dispersion film, and an extremely stable carbon nanotube network is constructed, thereby enabling the carbon nanotube structure to have good electric conductivity and good thermal conductivity. In addition, the carbon nanotube structure itself, because of its toughness and flexibility, also functions as a reinforcer, and thus provides a material with an extremely high mechanical strength. Furthermore, the carbon nanotube structure also has an effect of reducing cracks in ceramics upon calcining and an effect of saving the weight of ceramics.

The present composite where characteristics of ceramics have been imparted to the characteristics of carbon nanotubes is excellent not only in electric conductivity and thermal conductivity but also in mechanical characteristics. The present composite is suitable for applications including an antistatic material, various sliding materials, a bearing material, a structural material, a heat sink member, an electromagnetic shield material, and an electric field shield material.

Specifics of the above-described composite of the present invention including its shape and the like will be clarified in the following section of [Method of Manufacturing a Composite] and Example. Note that the descriptions below show merely examples and are not to limit specific modes of the composite of the present invention.

[Method of Manufacturing a Composite]

A method of manufacturing a composite of the present invention is a method suitable for manufacture of the above-described composite of the present invention. Specifically, the manufacturing method of the present invention includes: (A) a supplying step of supplying a surface of a substrate with a liquid solution (cross-linking application liquid) that contains carbon nanotubes having functional groups; (B) a cross-linking step of forming a carbon nanotube structure that constructs a network structure composed of the multiple carbon nanotubes that are cross-linked to each other by chemical bonds formed among the functional groups; and a combining step of combining the carbon nanotube structure and ceramics.

Hereinafter, the method of manufacturing the composite of the present invention will be described in detail separately in the respective steps.

(A) Supplying Step

In the present invention, a supplying step is a step of supplying the substrate surface with a liquid solution (cross-linking application liquid) that contains carbon nanotubes having functional groups. The cross-linking application liquid has to be supplied in the supplying step to all the desired regions but, as long as these desired regions are included, there is no need to supply the entire substrate surface with the application liquid.

Any method can be adopted to supply the cross-linking application liquid, and the liquid may be simply dropped or spread with a squeegee or may be applied by a common application method. Examples of common application methods include spin coating, wire bar coating, cast coating, roll coating, brush coating, dip coating, spray coating, and curtain coating. Further, the cross-linking application liquid can be also supplied by injecting into a mold or the like with a desired shape. For descriptions of the substrate, the carbon nanotubes having functional groups, the cross-linking agent, and the cross-linking application liquid, see the section of [Composite].

(B) Cross-Linking Step

In the present invention, a cross-linking step is a step of forming a carbon nanotube structure layer that constructs a network structure constituted of the multiple carbon nanotubes cross-linked with each other through curing of the cross-linking application liquid after application. The cross-linking application liquid has to be cured in the cross-linking step to form the carbon nanotube structure layer in all the desired regions but, as long as the desired regions are included, there is no need to cure all of the cross-linking application liquid supplied to the substrate surface.

An operation carried out in the cross-linking step is naturally determined according to the combination of the functional groups with the cross-linking agent or according to the functional group to be cross-linked. An example thereof is shown in Table 1 or Table 2. If a combination of thermally curable functional groups is employed, the applied liquid is heated by various heaters or the like. If a combination of functional groups that are cured by ultraviolet rays is employed, the applied liquid is irradiated with a UV lamp or left under the sun. If a combination of self-curable functional groups is employed, it is sufficient to let the applied liquid stand still. Leaving the applied liquid to stand still is deemed as one of the operations that may be carried out in the cross-linking step of the present invention.

Heat curing (polyesterification through ester exchange reaction) is conducted for the case of a combination of carbon nanotubes, to which the functional group —COOR (where R represents a substituted or unsubstituted hydrocarbon group) is added, and polyol (among them, glycerin and/or ethylene glycol). By heating, —COOR of the esterified carbon nanotube carboxylic acid and R'-OH (where R' represents a substituted or unsubstituted hydrocarbon group) of polyol react in an ester exchange reaction. As the reaction progresses multilaterally, the carbon nanotubes are cross-linked until a network of carbon nanotubes connected to each other constitutes a carbon nanotube structure layer.

To give an example of conditions preferable for the above combination, the heating temperature is specifically set to preferably 50 to 500° C., more preferably 150 to 200° C., and the heating period is specifically set to preferably 1 minute to 10 hours, more preferably 1 hour to 2 hours.

(Ceramics Combining Step)

After the carbon nanotube structure on the substrate produced in the above step is impregnated with a ceramic material, the resultant product is calcined at a predetermined temperature. A sol-gel method using a metal alkoxide or a metal organic decomposition (MOD) method is preferable as a method of combining ceramics with the carbon nanotube structure. By dropping ceramics raw materials onto the carbon nanotube structure or by immersing the structure into the raw materials, a sol or a liquid of raw materials penetrates into a network of the structure. After that, the mixture can be calcined to provide a nanotube-ceramics composite.

The ceramics to be combined with the carbon nanotube structure is not particularly limited, and can be appropriately selected depending on applications. Specific examples of the ceramics include oxide-based ceramics, nitride-based ceramics, carbide-based ceramics, boride-based ceramics, and silicide-based ceramics. However, oxide-based ceramics (for instance, $SiO_2$ or $TiO_2$) are preferable in terms of ease of manufacture.

Therefore, used as a ceramics raw material which forms oxide-based ceramics, nitride-based ceramics, carbide-based ceramics, boride-based ceramics, or silicide-based ceramics is a ceramics raw material that contains one selected from: a nonmetal such as O, N, B, C, or Si; a metal such as Al, Pb, or Bi; a transition metal such as Ti, Zr, Hf, or Y; an alkali metal such as K; an alkali earth metal such as Ca, Mg, or Sr; a rare earth such as La or Ce; and a halogen such as F or Cl.

In the combining step, calcining and sintering are preferably performed in a nitrogen atmosphere in order to avoid burnout of a carbon nanotube itself involved in the calcining and sintering. Furthermore, the ceramics raw materials are preferably calcined at temperatures equal to or lower than 2,000° C. from the viewpoint of preventing decomposition of the materials.

Furthermore, a nanotube-ceramics composite can also be obtained by another combination method including: mixing the cross-linking application liquid and a ceramics powder; supplying the mixture to the substrate; and cross-linking the carbon nanotube structure.

In the case of combining through mixing with a ceramics powder, the ceramics powder is preferably sintered. For example, a $Si_3N_4$ ceramics powder has a sintering temperature of 1,700° C., which is sufficiently high as compared to the heating temperature range of 120 to 550° C. in the cross-linking step of a carbon nanotube structure of the present invention. Therefore, in the case where such a combination is used, a composite can be produced as follows. First, a cross-linking application liquid and a ceramics powder are mixed, and the resultant solution is supplied to a substrate. Then, for example, the whole is initially heated at about 550° C., which is a cross-linking reaction temperature, for about 1 hour to form a carbon nanotube structure, and then the whole is continuously heated to 1,700° C. to sinter the ceramics powder.

The composite of the present invention can be produced via the above respective steps. However, the manufacturing method for a composite of the present invention may include another step.

For example, the method preferably includes a surface treatment step of treating the surface of the substrate in advance prior to the supplying step. The surface treatment step is performed for the purpose of enhancing an adsorbing property of the cross-linking application liquid to be supplied, enhancing adhesiveness between the carbon nanotube structure layer to be formed as an upper layer and the surface of the substrate, cleaning the surface of the substrate, adjusting the electric conductivity of the surface of the substrate, or the like.

Examples of the surface treatment step to be performed for the purpose of enhancing an adsorbing property of a cross-linking application liquid include a treatment by means of a silane coupling agent (for example, aminopropyltriethoxysilane or γ-(2-aminoethyl)aminopropyltrimethoxysilane). Of those, a surface treatment by means of aminopropyltriethoxysilane is widely performed and is also suitable for the surface treatment step in the present invention. The surface treatment by means of aminopropyltriethoxysilane has been conventionally used for a surface treatment of mica for use in a substrate for AFM observation of DNA as shown in a document such as Y. L. Lyubchenko et al., Nucleic Acids Research, 1993, vol. 21, p. 1117-1123.

A more specific description of the present invention is given below by way of Example. However, the present invention is not limited to the following example.

EXAMPLE (A) Applying Step (A-1) Preparation of Cross-Linking Application Liquid (Addition Step)

Figure 1:
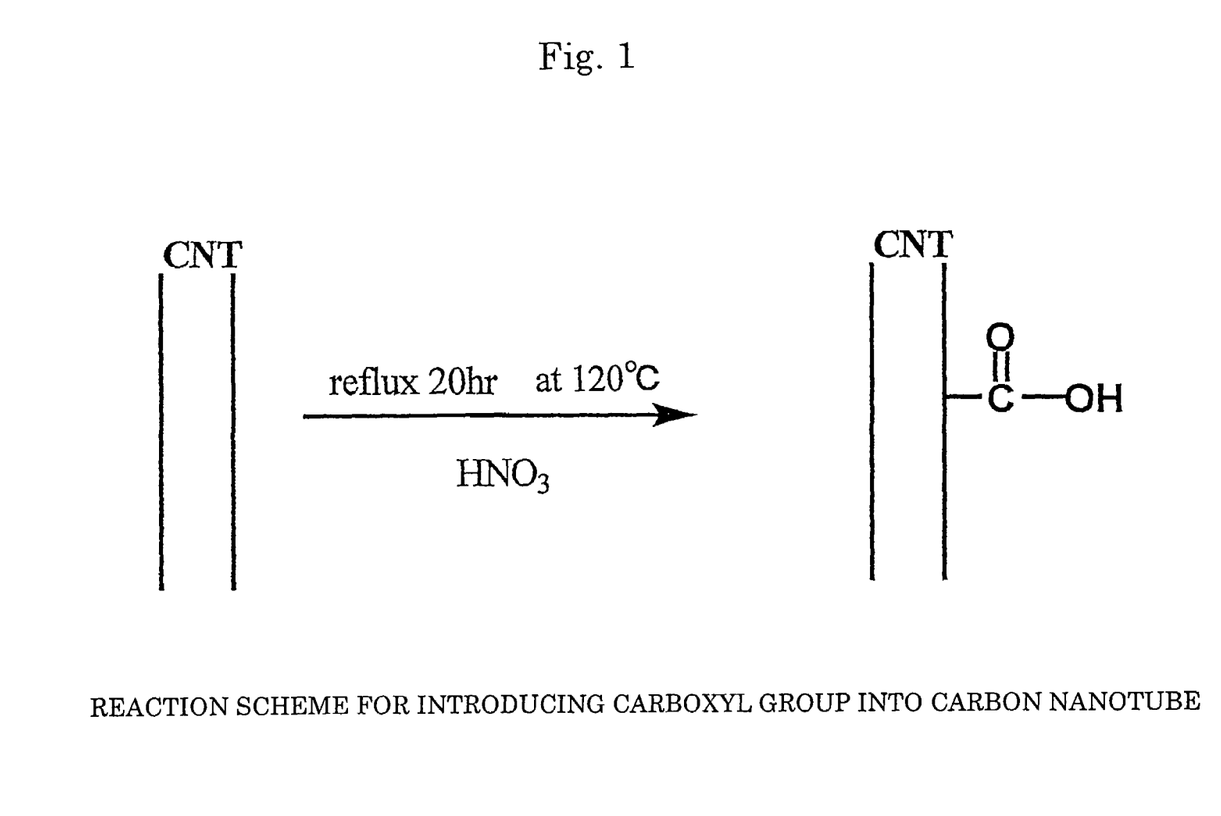
FIG. 1 shows a reaction scheme for synthesis of carbon nanotube carboxylic acid in (addition step) in Example.

(a) Addition of Carboxyl Group . . . Synthesis of Carbon Nanotube Carboxylic Acid 30 mg of multi-wall carbon nanotube powder (purity: 90%, average diameter: 30 nm, average length: 3 μm, available from Science Laboratory Inc.) was added to 20 ml of concentrated nitric acid (a 60 mass % aqueous solution, available from KANTO KAGAKU) for reflux at 120° C. for 20 hours to synthesize carbon nanotube carboxylic acid. A reaction scheme of the above is shown in FIG. 1. In FIG. 1, a carbon nanotube (CNT) portion is represented by two parallel lines (same applies for other figures relating to reaction schemes).

The temperature of the liquid solution was returned to room temperature, and the liquid solution was centrifuged at 5,000 rpm for 15 minutes to separate a supernatant liquid from a precipitate. The recovered precipitate was dispersed in 10 ml of pure water, and the dispersion liquid was subjected to centrifugal separation again at 5,000 rpm for 15 minutes to separate a supernatant liquid from a precipitate (the above process constitutes one washing operation). This washing operation was repeated five more times and lastly a precipitate was recovered.

An infrared absorption spectrum of the recovered precipitate was measured. An infrared absorption spectrum of the used multi-wall carbon nanotube raw material itself was also measured for comparison. A comparison between both the spectra revealed that absorption at 1,735 $cm^{-1}$ characteristic of a carboxylic acid, which was not observed in the multi-wall carbon nanotube raw material itself, was observed in the precipitate. This finding shows that a carboxyl group was introduced into a carbon nanotube by the reaction with nitric acid. In other words, this finding confirmed that the precipitate was carbon nanotube carboxylic acid.

Addition of the recovered precipitate to neutral pure water confirmed that dispensability was good. This result supports the result of the infrared absorption spectrum that a hydrophilic carboxyl group was introduced into a carbon nanotube.

Figure 2:
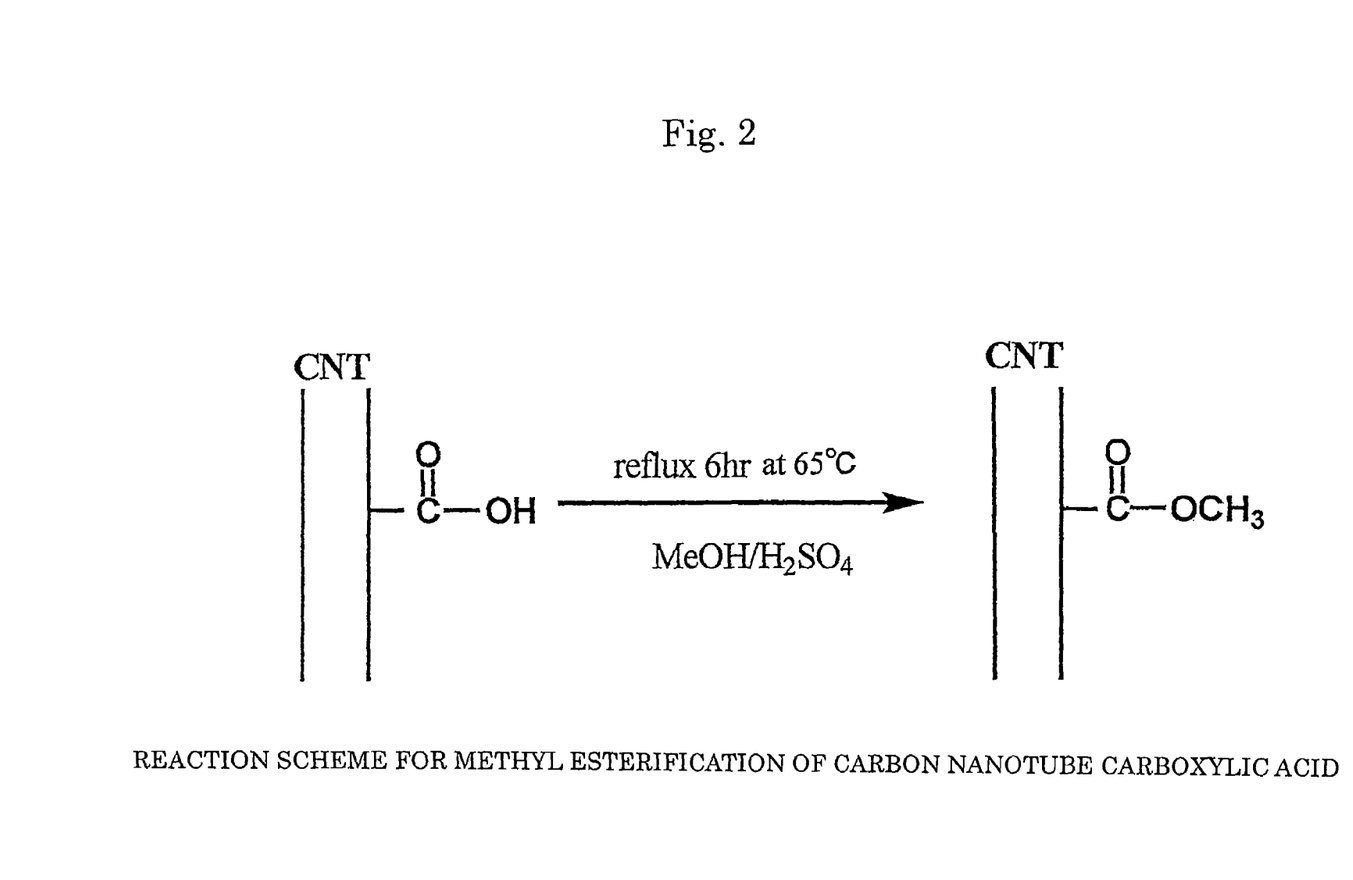
FIG. 2 shows a reaction scheme for esterification in (addition step) in Example.

(b) Esterification 30 mg of the carbon nanotube carboxylic acid prepared in the above step was added to 25 ml of methanol (available from Wako Pure Chemical Industries, Ltd.). Then, 5 ml of concentrated sulfuric acid (98 mass %, available from Wako Pure Chemical Industries, Ltd.) was added to the solution, and the whole was refluxed at 65° C. for 6 hours for methyl esterification. The reaction scheme for the above-mentioned methyl esterification is shown in FIG. 2.

After the temperature of the liquid solution had been recovered to room temperature, the liquid solution was filtered to separate a precipitate. The precipitate was washed with water, and was then recovered. An infrared absorption spectrum of the recovered precipitate was measured. As a result, absorption at 1,735 $cm^{-1}$ and that in the range of 1,000 to 1,300 $cm^{-1}$ characteristic of ester were observed. This result confirmed that the carbon nanotube carboxylic acid was esterified.

(Mixing Step)

30 mg of the carbon nanotube carboxylic acid methyl esterified in the above step was added to 4 g of glycerin (available from KANTO KAGAKU) and the whole was mixed using an ultrasonic disperser. Further, the mixture was added to 4 g of methanol as a viscosity modifier to prepare a cross-linking application liquid (1).

(A-2) Surface Treatment Step of Substrate

Prepared was a silicon wafer (76.2 mm φ (diameter of 3 inches), thickness of 380 μm, thickness of a surface oxide film of 1 μm, available from Advantech Co., Ltd) as a substrate. The silicon wafer was subjected to surface treatment using the cross-linking application liquid (1) to be applied to the wafer and aminopropyltriethoxysilane for enhancing adsorption with the silicon wafer.

The silicon wafer was subjected to the surface treatment using aminopropyltriethoxysilane by exposing the silicon wafer to steam of 50 μl of aminopropyltriethoxysilane (available from Sigma-Aldrich Co.) for about 3 hours in a closed Schale. For comparison, a silicon wafer not subjected to surface treatment was prepared separately as well.

(A-3) Applying Step

The cross-linking application liquid (1 μl) prepared in Step (A-1) was applied to the surface of the silicon wafer subjected to the surface treatment using a spin coater (1H-DX2, manufactured by MIKASA Co., Ltd.) at 100 rpm for 30 seconds. The silicon wafer not subjected to surface treatment was similarly applied with the liquid for comparison.

(B) Cross-Linking Step

Figure 3:
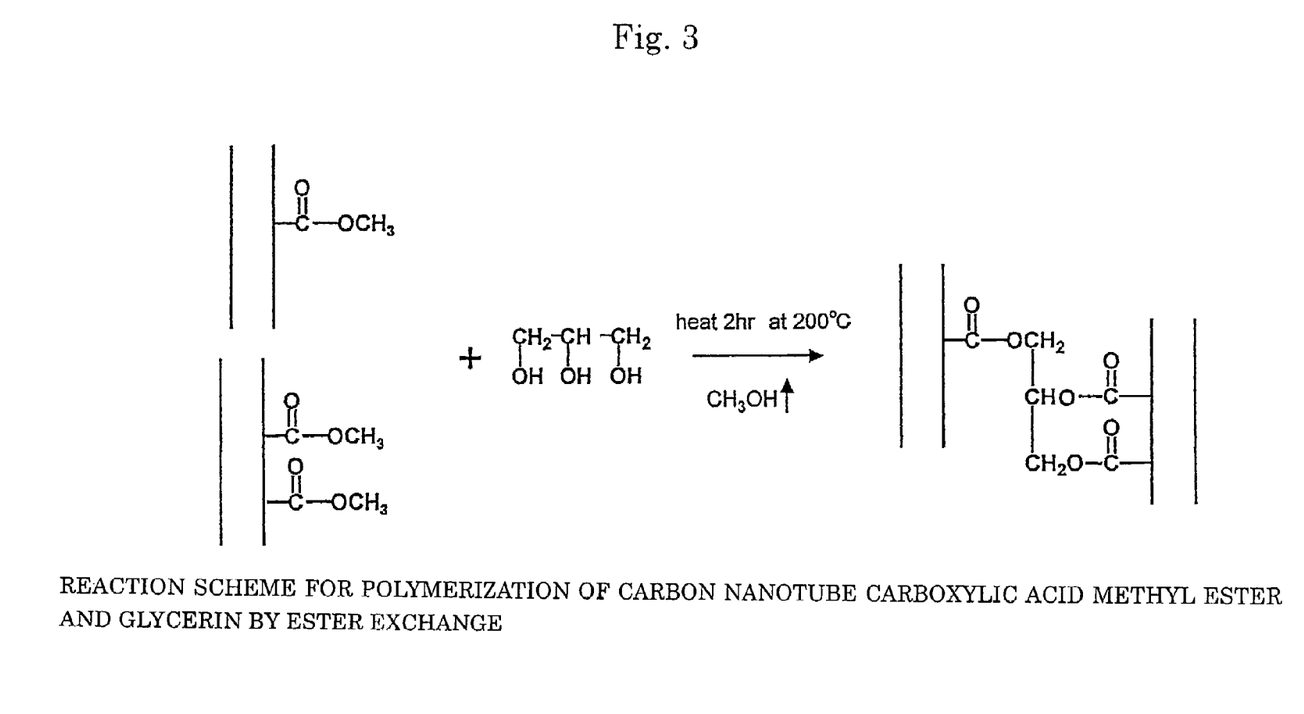
FIG. 3 shows a reaction scheme for cross-linking by an ester exchange reaction in (cross-linking step) in Example.

After the application of the cross-linking application liquid, the silicon wafer with the coat formed thereon was heated at 200° C. for 2 hours to cure the coat, thereby forming the carbon nanotube structure layer. The coat of the silicon wafer not subjected to surface treatment was similarly cured for comparison. FIG. 3 shows the reaction scheme.

The observation of a state of the obtained carbon nanotube structure layer using an optical microscope confirmed an extremely uniform cured film. Similar observation of the carbon nanotube structure layer formed on the silicon wafer not subjected to surface treatment for comparison, using an optical microscope confirmed a sufficiently uniform cured film, though slightly inferior to the layer on the silicon wafer subjected to surface treatment.

Figure 4:
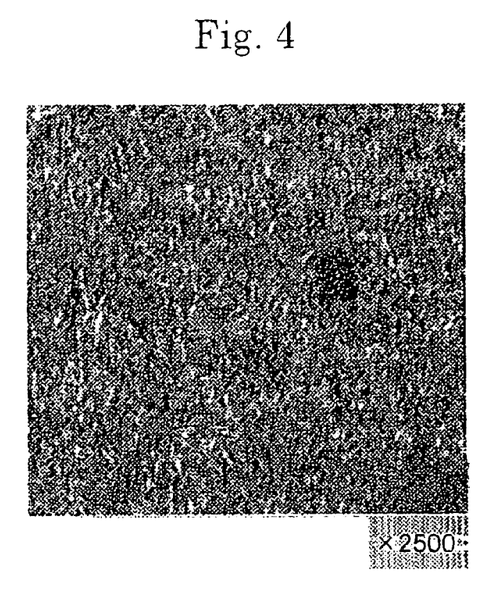
FIG. 4 is an optical micrograph (2,500-fold magnification) of the carbon nanotube structure layer obtained through a process of (cross-linking step) in Example.

FIG. 4 shows an optical micrograph (2,500-fold magnification) of the photographed carbon nanotube structure layer formed on the silicon wafer subjected to surface treatment. A slight error developed with a magnification of the photograph owing to a degree of a photograph enlargement or the like.

(C) Combining Step

Next, the layered carbon nanotube structure formed on the silicon wafer and network structured through the cross-linked site (carbon nanotube structure layer) was combined with the ceramics.

First, 2 μl of an MOD coating agent of $SiO_2$ (Si-05S, available from Kojundo Chemical Laboratory Co., Ltd.) was added dropwise to the carbon nanotube structure and was impregnated into the structure. Next, the carbon nanotube structure was heated at 120° C. for 30 minutes on a hot plate. Then, the carbon nanotube structure was annealed at 550° C. in nitrogen atmosphere for 1 hour using an infrared gold image furnace (RHL-P610C, manufactured by ULVAC, Inc.), to thereby obtain an $SiO_2$-carbon nanotube composite.

Figure 5:
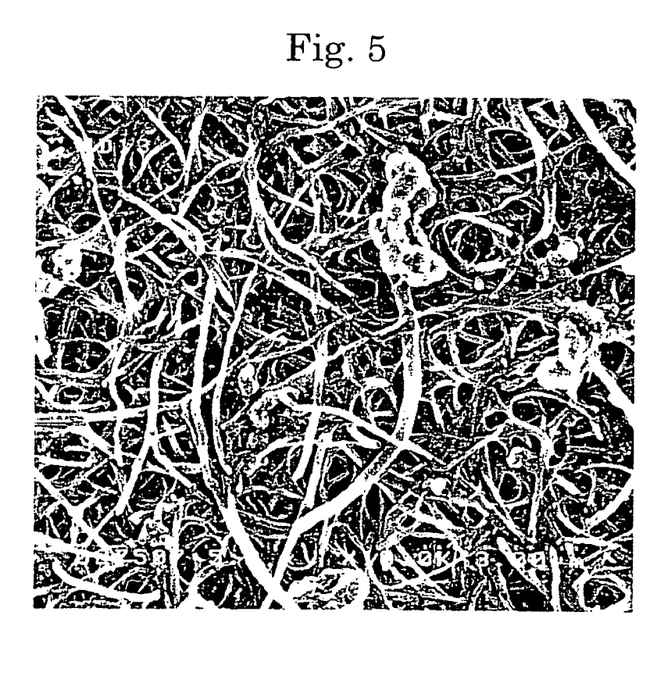
FIG. 5 is a scanning electron micrograph (10,000-fold magnification) of a composite.
Figure 6:
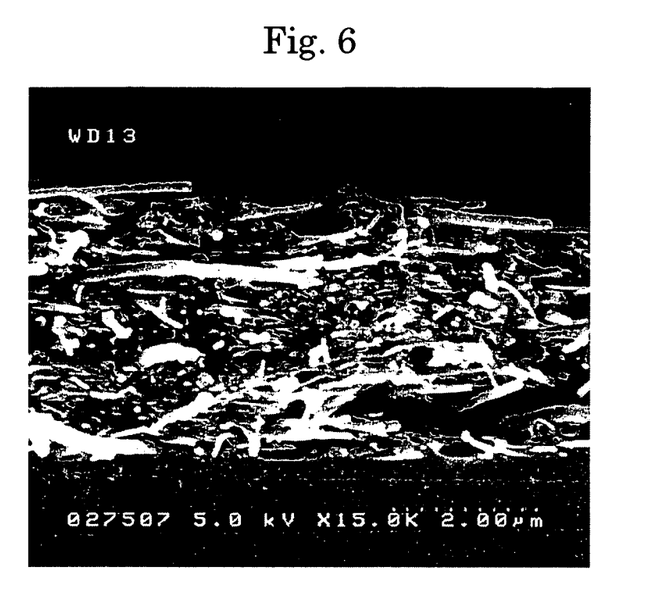
FIG. 6 is a cross-sectional scanning electron micrograph (10,000-fold magnification) of a composite.

A result of scanning electron microscope observation of the composite is shown in FIG. 5, and a result of cross-section observation of the composite is shown in FIG. 6. $SiO_2$ was filled between the carbon nanotube structures, and a composite without film cracks was formed. A region without the carbon nanotube structure formed at the same time was very brittle compared to places with carbon nanotubes.

Figure 7:
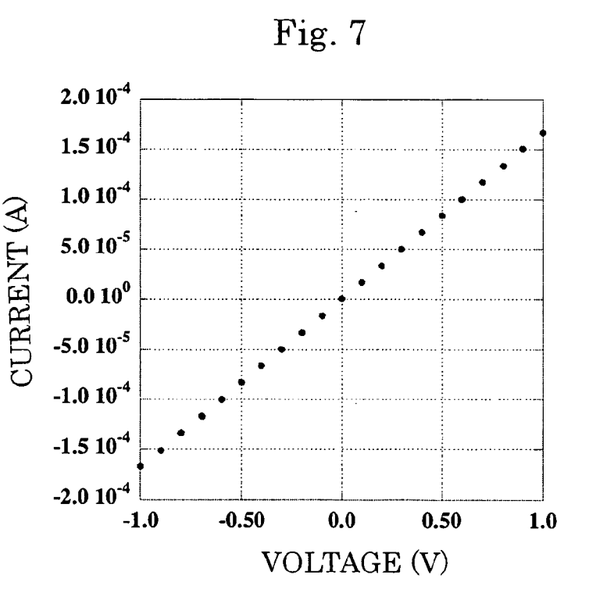
FIG. 7 is a graph showing a result of a current-voltage characteristics measurement of the composite formed in Example.

Next, FIG. 7 shows a result of a direct current-voltage characteristics measurement performed through a two terminal method of the composite obtained in Example. The result confirmed that the composite composed of the carbon nanotube structure and the ceramics of the present invention exhibits electric conductivity.

According to the present invention, as described above, the ceramics composite with high mechanical strength and excellent thermal or electric conductivity can be provided.

What is claimed is:

1. A composite formed comprising a carbon nanotube structure and ceramics, wherein the carbon nanotube structure is constituted by chemically bonding functional groups, that are bonded to multiple carbon nanotubes, to mutually cross-link to construct a network structure, wherein each of the cross-linked sites, where the multiple carbon nanotubes are mutually cross-linked, has a chemical structure selected from the group consisting of —COO($CH_2$)$_2$OCO—, —COO$CH_2$CHOH$CH_2$OCO—, —COO$CH_2$CH(OCO—)$CH_2$OH, and —COO$CH_2$CH(OCO—)$CH_2$OCO—.

2. A composite according to claim 1, wherein the carbon nanotube structure is obtained by curing a liquid solution containing multiple carbon nanotubes to which functional groups are bonded and a cross-linking agent that prompts a cross-linking reaction with the functional groups to cross-link the multiple functional groups bonded to the carbon nanotubes with the cross-linking agent for formation of a cross-linked site.

3. A composite according to claim 2, wherein the cross-linking agent is not self-polymerizable.

4. A composite according to claim 2, wherein the cross-linked sites are formed though chemical bonding of the multiple functional groups.

5. A composite according to claim 1, wherein a reaction forming the chemical bonds is one reaction selected from the group consisting of a dehydration condensation, a substitution reaction, an addition reaction, and an oxidative reaction.

6. A composite according to claim 1, wherein the multiple carbon nanotubes are multi-wall carbon nanotubes.

7. A composite according to claim 1, wherein the ceramics comprises one selected from the group consisting of oxide-based ceramics, nitride-based ceramics, carbide-based ceramics, boride-based ceramics, and silicide-based ceramics.

8. A composite formed comprising a carbon nanotube structure and ceramics, wherein the carbon nanotube structure is constituted by chemically bonding functional groups, that are bonded to multiple carbon nanotubes, to mutually cross-link to construct a network structure, wherein the ceramics comprises one selected from the group consisting of nitride-based ceramics, carbide-based ceramics, boride-based ceramics, and silicide-based ceramics.

9. A composite according to claim 8, wherein each of the cross-linked sites, where the multiple carbon nanotubes are mutually cross-linked, has one chemical structure selected from the group consisting of —COOCO—, —O—, —NHCO—, —COO—, —NCH—, —NH—, —S—, —O—, —NHCOO—, and —S—S—.

10. A method of manufacturing a composite, comprising the steps of:

supplying a substrate surface with a liquid solution containing multiple carbon nanotubes to which multiple functional groups are bonded;

mutually cross-linking the multiple carbon nanotubes through chemical bonding of the multiple functional groups together to construct a network structure, thereby forming a carbon nanotube structure, wherein each of the cross-linked sites, where the multiple carbon nanotubes are mutually cross-linked, has a chemical structure selected from the group consisting of —COO(CH$_2$)$_2$OCO—, —COOCH$_2$CHOHCH$_2$OCO—, —COOCH$_2$CH(OCO—)CH$_2$OH, and —COOCH$_2$CH(OCO—)CH$_2$OCO—; and combining the carbon nanotube structure and ceramics.

11. A method of manufacturing a composite according to claim 10, wherein the combining step further comprises a calcining step of calcining the carbon nanotube structure by impregnating the carbon nanotube structure with a raw material of the ceramics.

12. A method of manufacturing a composite according to claim 10, wherein the ceramics raw material contains one selected from the group consisting of: nonmetals such as O, N, B, C, and Si; metals such as Al, Pb, and Bi; transition metals such as Ti, Zr, Hf, and Y; alkali metals such as K; alkali earth metals such as Ca, Mg, and Sr; rare earth metals such as La and Ce; and halogens such as F and Cl.

13. A method of manufacturing a composite according to claim 10, wherein:
the liquid solution contains a cross-linking agent that cross-links the multiple functional groups together; and
the cross-linking agent is not self-polymerizable.

14. A method of manufacturing a composite according to claim 13, wherein:
each of the functional groups is at least one functional group selected from the group consisting of —OH, —COOH, —COOR (where R represents a substituted or unsubstituted hydrocarbon group), —COX (where X represents a halogen atom), —NH$_2$, and —NCO; and
the cross-linking agent is capable of prompting a cross-linking reaction with the selected functional groups.

15. A method of manufacturing a composite according to claim 13, wherein:
the cross-linking agent is at least one cross-linking agent selected from the group consisting of a polyol, a polyamine, a polycarboxylic acid, a polycarboxylate, a polycarboxylic acid halide, a polycarbodiimide, and a polyisocyanate; and
the functional groups are capable of prompting a cross-linking reaction with the selected cross-linking agent.

16. A method of manufacturing a composite according to claim 13, wherein:
each of the functional groups is at least one functional group selected from the group consisting of —OH, —COOH, —COOR (where R represents a substituted or unsubstituted hydrocarbon group), —COX (where X represents a halogen atom), —NH$_2$, and —NCO;
the cross-linking agent is at least one cross-linking agent selected from the group consisting of polyol, polyamine, polycarboxylic acid, polycarboxylate, polycarboxylic acid halide, polycarbodiimide, and polyisocyanate; and
the functional groups and the cross-linking agents are respectively selected for a combination capable of prompting a cross-linking reaction with each other.

17. A method of manufacturing a composite according to claim 13, wherein each of the functional group is —COOR (where R represents a substituted or unsubstituted hydrocarbon group).

18. A method of manufacturing a composite according to claim 17, wherein the cross-linking agent is a polyol.

19. A method of manufacturing a composite according to claim 17, wherein the cross-linking agent is at least one cross-linking agent selected from the group consisting of glycerin, ethylene glycol, butenediol, hexynediol, hydroquinone, and naphthalenediol.

20. A method of manufacturing a composite according to claim 10, wherein the liquid solution further contains a solvent.

21. A method of manufacturing a composite according to claim 20, wherein the cross-linking agent also functions as a solvent.

22. A method of manufacturing a composite according to claim 10, wherein a reaction forming the chemical bonding is a reaction for chemically bonding the multiple functional groups together.

23. A method of manufacturing a composite according to claim 22, wherein the liquid solution further contains an additive that forms the chemical bonds among the functional groups.

24. A method of manufacturing a composite according to claim 23, wherein the reaction is dehydration condensation and the additive is a condensing agent.

25. A method of manufacturing a composite according to claim 24, wherein each of the functional groups is at least one functional group selected from the group consisting of —COOR (where R represents a substituted or unsubstituted hydrocarbon group), —COOH, —COX (where X represents a halogen atom), —OH, —CHO—, and —NH$_2$.

26. A method of manufacturing a composite according to claim 25, wherein each of the functional groups is —COOH.

27. A method of manufacturing a composite according to claim 24, wherein the condensing agent is one compound selected from the group consisting of sulfuric acid, N-ethyl-N'-(3-dimethylaminopropyl)carbodiimide, and dicyclohexyl carbodiimide.

28. A method of manufacturing a composite according to claim 22, wherein the reaction is a substitution reaction and the additive is a base.

29. A method of manufacturing a composite according to claim 28, wherein each of the functional groups is one functional group selected from the group consisting of —NH$_2$, —X (where X represents a halogen atom), —SH, —OH, —OSO$_2$CH$_3$, and —OSO$_2$(C$_6$H$_4$)CH$_3$.

30. A method of manufacturing a composite according to claim 28, wherein the base is one base selected from the group consisting of sodium hydroxide, potassium hydroxide, pyridine, and sodium ethoxide.

31. A method of manufacturing a composite according to claim 22, wherein the reaction is an addition reaction.

32. A method of manufacturing a composite according to claim 31, wherein each of the functional groups is at least one functional group selected from the group consisting of —OH and —NCO.

33. A method of manufacturing a composite according to claim 22, wherein the reaction is an oxidative reaction.

34. A method of manufacturing a composite according to claim 33, wherein each of the functional groups is —SH.

35. A method of manufacturing a composite according to claim 33, wherein the liquid solution further contains an oxidative reaction accelerator.

36. A method of manufacturing a composite according to claim 35, wherein the oxidative reaction accelerator is iodine.

* * * * *